United States Patent [19]
Kent et al.

[11] Patent Number: 5,625,623
[45] Date of Patent: Apr. 29, 1997

[54] RF SITE COMMUNICATION LINK

[75] Inventors: James S. Kent; Houston H. Hughes, III; Kenneth W. Morris, all of Lynchburg, Va.

[73] Assignee: Erilsson GE Mobile Communications Inc., Research Triangle Park, N.C.

[21] Appl. No.: 321,342

[22] Filed: Oct. 14, 1994

[51] Int. Cl.$^6$ ........................................................ H04J 4/00
[52] U.S. Cl. ............................ 370/280; 370/341; 370/329; 455/34.1; 455/53.1
[58] Field of Search ........................ 370/24, 13, 26, 370/16, 30, 31, 17, 32, 45, 50, 69.1, 120, 123, 75, 85.7, 95.1, 95.3, 105.2; 455/7, 9, 11.1, 20, 22, 34.1, 53.1, 54.1, 56.1, 67.1; 340/825.03; 379/59, 60; 375/219, 220, 222

[56] References Cited

U.S. PATENT DOCUMENTS

| | | | |
|---|---|---|---|
| 4,255,814 | 3/1981 | Osborn | 455/51 |
| 4,308,429 | 12/1981 | Kai et al. | 179/2 EB |
| 4,549,293 | 10/1985 | Christian et al. | 370/95.3 |
| 4,764,979 | 8/1988 | Noguchi et al. | 455/22 |
| 4,783,843 | 11/1988 | Leff et al. | 455/22 |
| 4,924,457 | 5/1990 | Shimizu | 370/56 |
| 4,968,966 | 11/1990 | Jasinski et al. | 340/825.44 |
| 5,038,342 | 8/1991 | Crisler et al. | 370/50 |
| 5,040,237 | 8/1991 | Barnes et al. | 455/8 |
| 5,058,199 | 10/1991 | Grube | 455/15 |
| 5,128,934 | 7/1992 | Jasinski | 370/84 |
| 5,172,396 | 12/1992 | Rose, Jr. et al. | 375/107 |
| 5,193,091 | 3/1993 | Crisler et al. | 370/95.1 |
| 5,220,676 | 6/1993 | LoGalbo et al. | 455/51.2 |
| 5,222,249 | 6/1993 | Carney | 455/33.2 |
| 5,241,537 | 8/1993 | Gulliford et al. | 370/67 |
| 5,249,230 | 9/1993 | Mihm, Jr. | 380/23 |
| 5,260,700 | 11/1993 | Merchant et al. | 340/825.44 |
| 5,260,943 | 11/1993 | Comroe et al. | 370/95.1 |
| 5,285,443 | 2/1994 | Patsiokas et al. | 370/29 |
| 5,305,308 | 4/1994 | English et al. | 370/32.1 |
| 5,321,696 | 6/1994 | Buchholz et al. | 370/94.1 |
| 5,333,178 | 7/1994 | Norell | 379/59 |
| 5,357,503 | 10/1994 | Montarges et al. | 370/58.3 |

FOREIGN PATENT DOCUMENTS

| | | | |
|---|---|---|---|
| 63-95740 | 4/1988 | Japan. | |
| 0286228 | 3/1990 | Japan. | |
| 0613854 | 12/1948 | United Kingdom. | |
| WO8502745 | 6/1985 | WIPO | H04Q 7/02 |
| WO9306684 | 4/1993 | WIPO | H04M 11/00 |

OTHER PUBLICATIONS

Communication Engineering, Jan.–Feb. 1954, vol. 14.
The Antenna Specialist Co., "Extend-A-Cell™ Low Power Booster," 1988, pp. 1–6.

*Primary Examiner*—Benedict V. Safourek
*Assistant Examiner*—Ricky Q. Ngo
*Attorney, Agent, or Firm*—Charles L. Moore

[57] ABSTRACT

A RF site link for communicating between a centralized switching system and a plurality of mobile communications RF base stations is disclosed. The RF site link includes a plurality of RF link devices connected to centralized switching equipment. The RF link devices transmit signals to and receive signals from the remote base stations over the same working channels that the base stations use to communicate with the mobile or portable radios within each of the base stations' areas of operation. A RF control link is provided to control the assignment of the working channels between the centralized switching equipment and each of the base stations within the system.

15 Claims, 8 Drawing Sheets

RF SITE COMMUNICATION LINK

BACKGROUND OF THE INVENTION

The present invention relates generally to radio frequency (RF) communications systems, and more particularly, to a RF site communications link for transmitting and receiving signals or calls between centralized switching equipment of a RF communications system and at least one of a plurality of remote mobile communications RF base station sites.

FIG. 1 illustrates a schematic diagram of a simplified example of a RF communications system 100 having base stations 102 at multiple sites S1, S2 and S3 which provide communications to geographic areas A1, A2 and A3, respectively. The base stations 102 each include a radio repeater for receiving signals or calls from a mobile or portable transceiver 104 and retransmitting those signals to other mobile or portable transceivers 104 within the same geographic area served by the same site. If the transceiver 104 (unit 1) in area A1, for example, desires to communicate with another transceiver 104 in geographical area A2 served by base station site S2, the signal or call is transmitted from base station site S1 along communications link 106 to centralized switching equipment 108. The centralized switching equipment 108 then switches according to the signals received from base station site S1 to transmit the call on communications link 106' to the base station 102 at site S2 which receives the signal and transmits it to mobile transceiver 104 (unit 2) in area A2.

The communications links 106 and 106' may be either dedicated leased telephone lines and/or microwave transmission equipment which cause the system communications operator additional expenses in either leasing the dedicated telephone lines or the additional expense for the microwave transmission equipment and the licensing fees for the additional frequencies over which the microwave transmission equipment will operate.

RF leased line eliminator products, such as UNITEL-RTL100™ as manufactured by Telepoint Inc. or the like are available to provide point-to-point RF links to permit elimination of the leased telephone lines or microwave transmission equipment; however, these devices also use dedicated frequencies for the point-to-point links and require the system operator to obtain licenses for these additional frequencies.

It is accordingly a primary objective of the present invention to provide a novel RF communications link between a remote base station site and a central switch which permits elimination of the leased telephone lines and/or the microwave transmission equipment.

Other objects of the present invention, together with features and advantages thereof, will become apparent from the following detailed specification when read with the accompanying drawings in which like reference numerals refer to like elements.

SUMMARY OF THE INVENTION

The present invention provides a RF site communications link for transmitting and receiving signals or calls between a centralized switch and a plurality of remote mobile communications RF base stations. The RF site link includes a plurality of RP link devices connected to the centralized switching equipment. Each of the plurality of RF link devices transmits and receives signals or calls on a different one of a plurality of working channels associated with each of the base stations, and each of the plurality of working channels at each base station also transmit signals to and receives signals from the mobile or portable radios served by the base station site. During a duplex or two-way communication, the mobile or portable radio and one of the RF link devices will transmit signals on a first frequency of one of the working channels assigned for the call and will receive signals on a second frequency of the assigned working channel while the base station will receive signals on the first frequency and transmit signals on the second frequency of the assigned working channel.

The RF site link further includes a RP control link to control assignment of the working channels between the centralized switching equipment and each base station.

In accordance with one embodiment of the present invention for use in an all digital system that uses digital switching equipment and digital transmission equipment, the RF link devices each include a universal asynchronous receiver/transmitter (UART) device connected respectively to a transmit terminal and a receive terminal of the centralized switching equipment. A transmitter is connected to an output of the UART device to transmit digital signals to at least one of the base stations on the first frequency of an assigned, associated working channel when an output signal from the centralized switching equipment is present at a push-to-talk (PTT) terminal of the RF link device. A receiver is connected to an input of the UART device to receive digital signals from the base station on the second frequency of the associated working channel. The received signal is passed from the UART to the receive or input terminal of the centralized switching equipment for further routing.

In accordance with another embodiment of the present invention for use in a system which communicates both speech or clear voice (analog) and data (digital), each of the RF link devices include a transmitter and a modem. The modem is connected respectively to a transmit terminal and a receive terminal of the centralized switching equipment. A UART is connected to the modem and a first switch is provided for alternatively connecting the transmitter to the transmit terminal of the centralized switching equipment or to the UART. The switch normally connects the transmitter to the transmit terminal of the centralized switching equipment to transmit audio signals or voice calls from the centralized switching equipment to at least one of the base stations on a first frequency of the working channel associated with the assigned RF link device when an output signal from the centralized switching equipment is present at a PTT terminal of the RF link device, and the modem causes the switch to connect the transmitter alternatively to the UART when the modem detects digital signals or modem data being transferred from the centralized switching equipment to cause the digital signals to be demodulated by the modem for transmission to at least one of the base stations on the first frequency of the associated working channel when the output signal from the centralized switching equipment is present at the PTT terminal of the RF link device. The RF link device further includes a receiver connected to the UART and a second switch. The second switch normally connects the receiver to a receive terminal of the centralized switching equipment when receiving audio signals from one of the base stations on a second frequency of an associated working channel and alternatively opens to disconnect the direct signal from the receiver to the central switch whenever the modem detects digital data signals being received by the receiver from one of the base stations on a second frequency of an associated working channel.

DETAILED DESCRIPTION OF THE PREFERRED EMBODIMENTS

Figure 2:
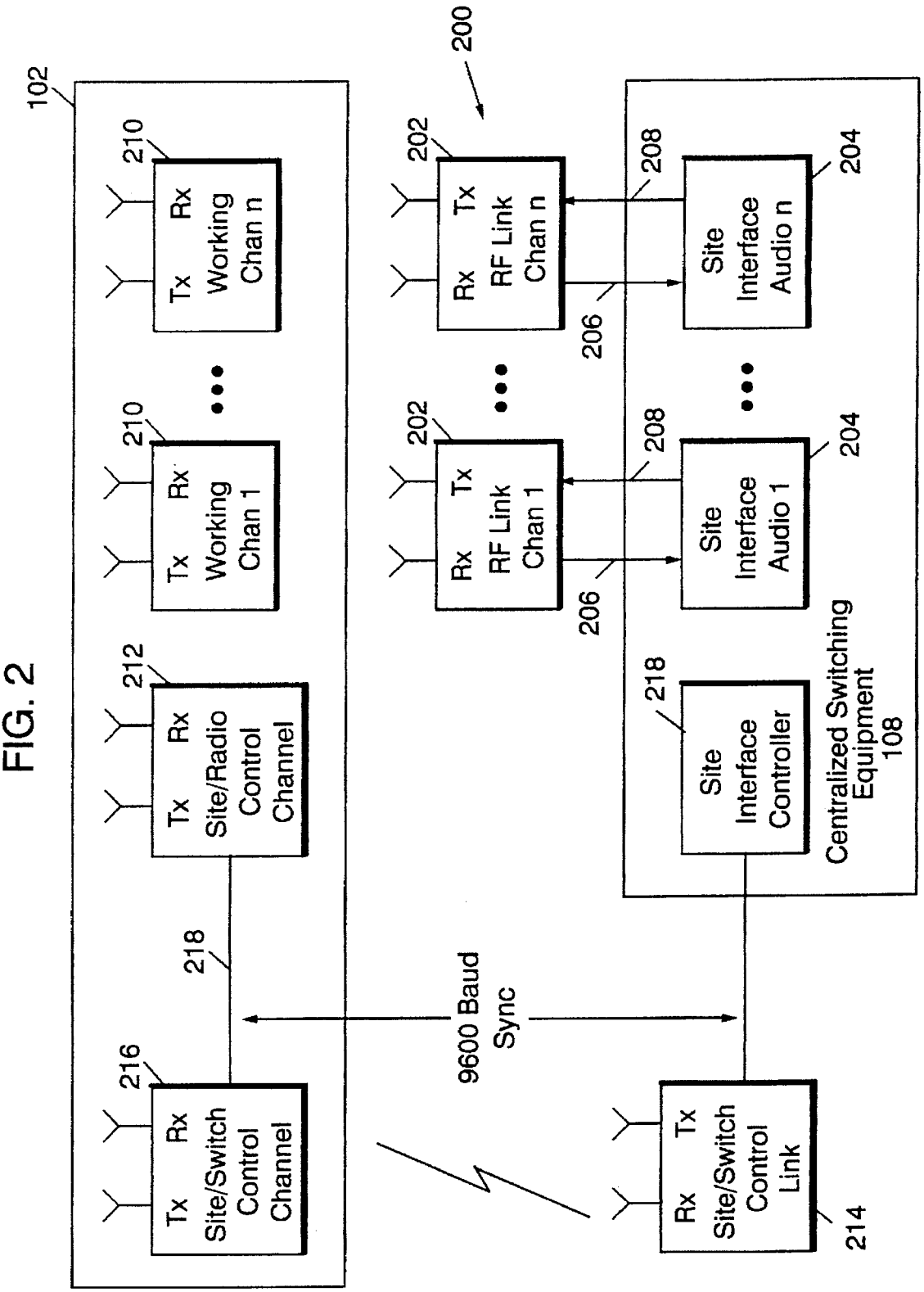
FIG. 2 is a block schematic diagram of a RF communications system with the RF site communications link in accordance with the present invention.

Referring initially to FIG. 2, the RF site link, indicated generally by reference numeral 200, includes a plurality of RF link devices 202 which are connected respectively to site interface audio devices 204 by transmit and receive communication links 206 and 208. The site interface audio devices 204 are part of the centralized switching equipment 108 and perform the function of interfacing the RF site transmit/receive signals to the common switching system 108. For example, site transmit audio needs to be placed on a common audio bus (not shown) so other sites 102 can pick it up if needed. Similarly, audio from other sites 102 needs to be picked up (off of a common audio bus) and sent to the local site if required. The interface also takes data from a site to switch control link 214 and formats and sends it to other devices in the central switch 108. Such interface devices 208 and busses are described in more detail in U.S. Pat. No. 5,214,537; entitled "Conventional Base Station Interface Architecture for RF Trunking Multisite Switch" by Phillip C. Gulliford et al. which is assigned to the same assignee as the present invention and is incorporated herein in its entirety by reference.

Each one of the RF link devices 202 transmit and receive audio and digital or modem data signals on a different channel corresponding to one of a plurality of working channels 210 associated with the base station 102. A base station working channel 210 is selected or assigned for communication between the base station 102 and both an associated RF link device 202 and a mobile or portable transceiver 104 (FIG. 3).

Figure 3:
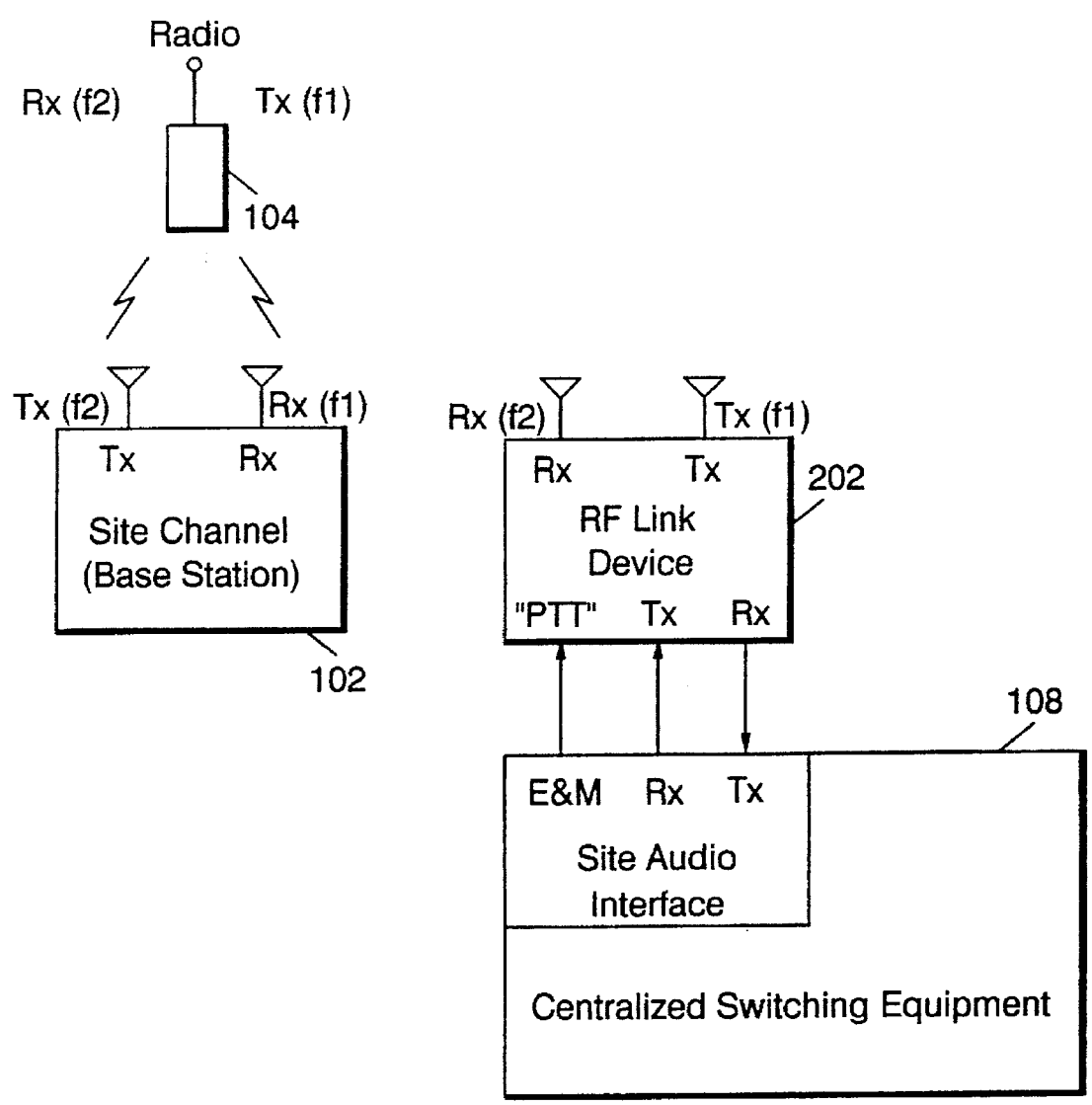
FIG. 3 is a block schematic diagram of a single channel of a RF site link for transmitting audio and data signals in accordance with the present invention.

Referring also to FIG. 3, the portable radio 104 and the RF link device 202 each transmit from a transmission terminal (Tx) at a first frequency f1 and receive on a second frequency f2 of one of the working channels 210 while the base station transmits and receives on inverse channel assignments, namely, the base station will transmit on the second frequency f2 of the working channel and receive on the first frequency f1 of the working channel. This "inverse" frequency assignment for each RF link device 202 and base station working channel 210 permits the centralized switching equipment 108 to communicate with the remote base station 102 repeaters and to eliminate the leased telephone lines or separate microwave equipment.

Referring back to FIG. 2, the assignment of a working channel 210 for communication between the base station 102 and one or more portable or mobile radios 104 is performed by a site/radio control channel 212, and the assignment of the same working channel for communication between the base station site 102 and the switching equipment 108 is controlled by a site/switch control link 214 associated with the switching equipment 108. The site/switch control link 214 transmits and receives digital control signals over a site/switch control channel 216 which coordinates with the site/radio control channel 212 via path 218. Data is transmitted over the site/switch control channel at 9600 baud and the control link 214 and control channel 216 also provide synchronization between the RF link devices 202 and the respective associated working channels 210.

The site/switch control link 214 is connected to a site interface controller 218 of the central switch 108 which causes connection of the signals being switched through the switching equipment 108 to be connected to the appropriate site interface 204 and RF link device 202 in coordination with the assignment of a working channel 210.

The RF control link 214 requires a RF connection capable of transmitting serial data continuously. An arrangement similar to the digital transmission path for transmission from the central switch 108 to the base station 102 shown in FIG. 6 may be used for this purpose. Alternatively, there are also RF serial link transport devices which are commercially available which may be used for this purpose. An error correction/retransmission protocol, such as a high-level data link control (HDLC) or the like may be needed to provide the same level of operational integrity as a leased line/modem connection. A RF control link 200 may also have a lower effective throughput than a leased line connection, so the number of base stations operating through an individual central switch 108 may need to be limited to avoid exceeding the processing capabilities of the RF arrangement.

Figure 4:
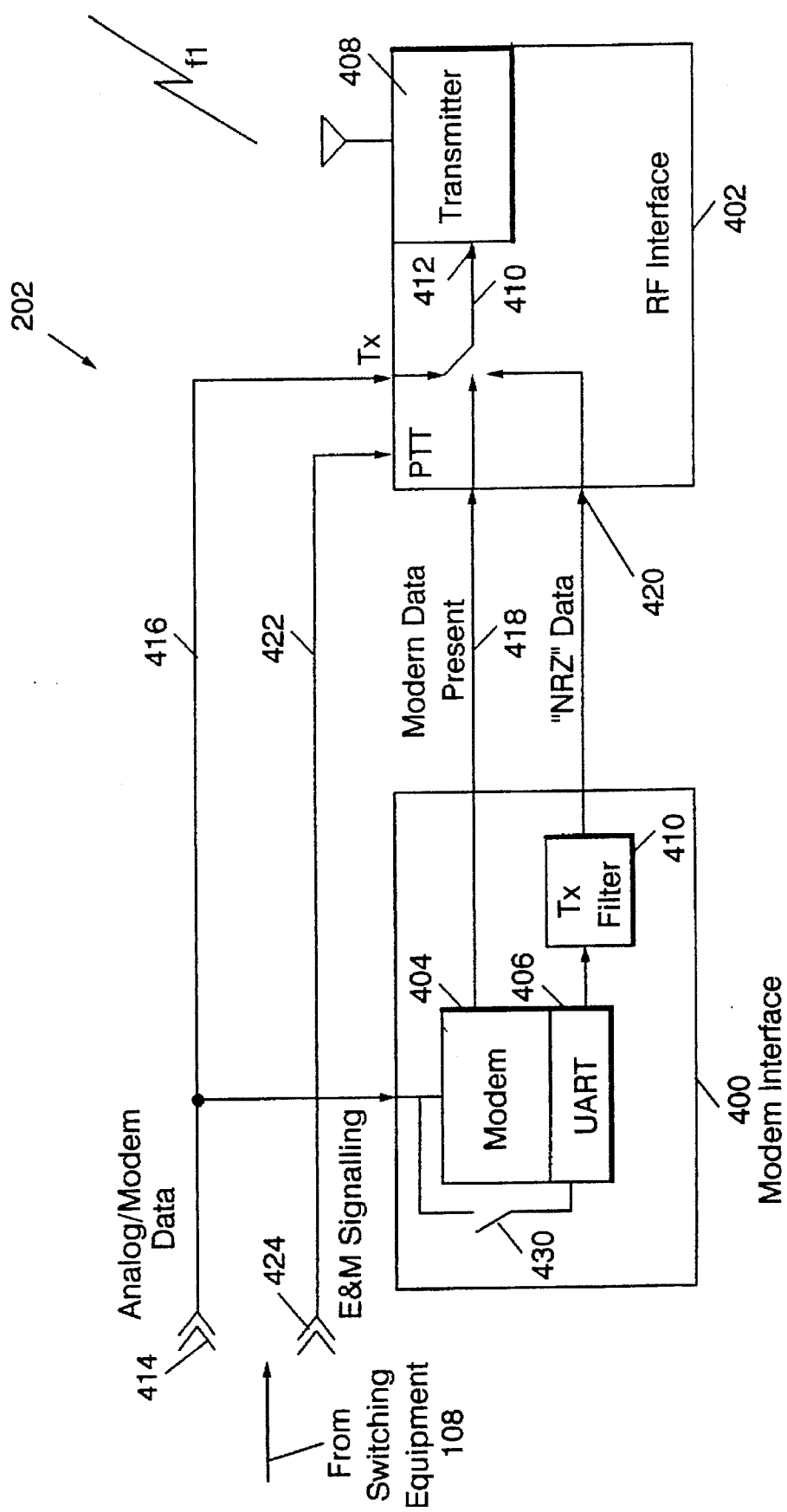
FIG. 4 is a block schematic diagram of the transmit path of the RF site link for transmitting audio and digital data signals from the switching equipment to the base station site in accordance with one embodiment of the present invention.

FIG. 4 illustrates one embodiment of the present invention for transmitting clear voice or speech signals or digital (modem data) from the switching equipment 108 (FIG. 2) to the base station site 102 (FIG. 2). The RF link equipment 202 includes a modem interface 400 and a RF interface 402. The modem interface 400 includes a modem 404 and a universal asynchronous receiver/transmitter (UART) 406 to demodulate modem data from the switching equipment 108 before it can be transmitted by a RF site link transmitter 408 contained in the RF interface 402. Modem data will be output from the switching equipment 108 whenever a digital radio call, including voice guard (encrypted speech) or data calls are routed through the switch 108. A filter or translator 410 may be needed to convert the data from the UART 406 to a form (non-return to zero, "NRZ" data) that can be accepted by the transmitter 408.

In accordance with the present invention, the RF interface 402 includes a switch 410 connected to an input terminal 412 of the transmitter 408. The switch 410 may be a Master 3 or Master 2E switch as manufactured by Ericsson GE Mobile Communications Inc., Lynchburg, Va., or the like. The switch 410 in its normal position connects an analog input 412 of the transmitter 408 to an output terminal 414 of the switching equipment 108 for the transmission of clear voice signals to a remote base station 102.

If digital data is detected by the modem's data detect capability, a signal will be sent to the switch 410 via a conductor 418 to cause the switch 410 to operate to connect the transmitter 408 to its digital signal input 420. The transmitter 408 will be keyed or activated to transmit an analog signal (clear voice) or digital signal (modem data) by ear and mouth (E&M) signaling connected to the PTT terminal of the RF interface 402 by communications link or path 422 between an output terminal 424 of the central switch 108 and the interface 402. Since only E&M out of band signaling is available between the central switch 108 and the RF link transmitter 408, the in band signaling between modem 404 and the switch 410 over conductor 418 is required. Additionally, because the central switch 108 to base station site 102 audio/data signals will be routed to the base station Rx repeater over a working channel 210 instead of through a dedicated telephone line or microwave interface, E&M or tone signaling between the central switch 108 and the base station 102 cannot be supported because the E&M signal requires a four-line telephone interface. Accordingly, the RF link device 202 must use the same signaling protocol when communicating with the base station 102 that a portable radio 104 uses when communicating with the base station 102 to keep the base station working channel 210 active. This signaling protocol involves known low speed, subaudible inbound signaling which is interleaved with normal transmission.

Figure 1:
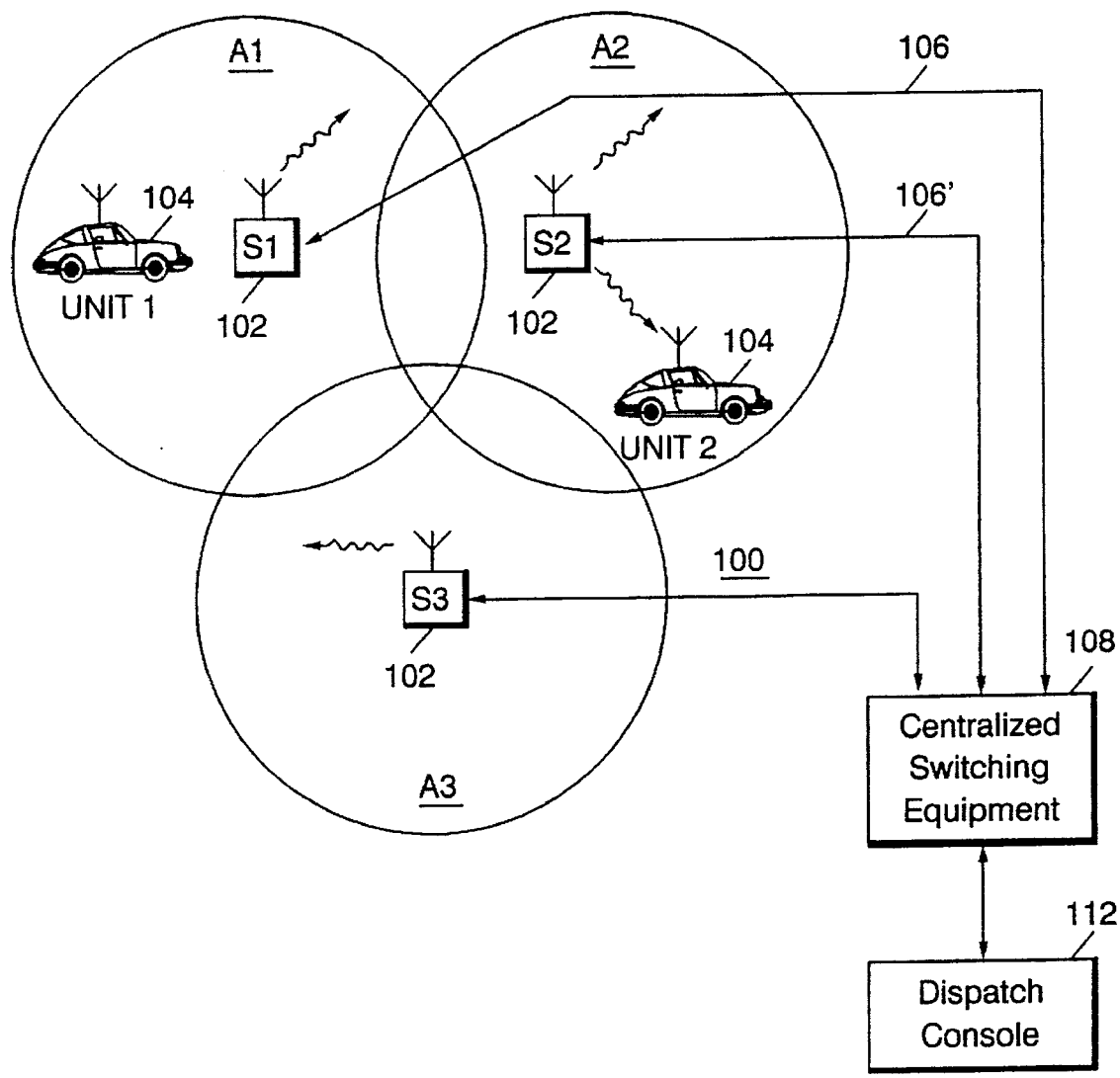
FIG. 1 is a block schematic diagram of a RF communications system with multiple site base stations interconnected to a central switch by leased telephone lines or a microwave link.

Since the central switch 108 to base station 102 audio communications and the base station 102 and portable radio 104 audio communications will be using the same path or communications equipment in the base station 102, a console 112 (FIG. 1) pre-empt of radio transmissions must be specially handled. The base station 102 call processing process could be modified to drop an existing mobile or portable radio 104 transmit repeat to the central switch 108 and/or to other radios 104 operating from the same base station 102, when the console 112 attempts to pre-empt a transmission from the radio 104. The base station 102 would be programmed to assign the console pre-empt to a new idle working channel 210 to avoid interference from the transmitting radio 104. (In most systems a base station 102 usually cannot drop a transmitting radio 104 but it can stop repeating the communications signals to other radios operating on the same base station 102.) If the central switch 108 to base station 102 RF transmission is significantly stronger than the average mobile radio 104 transmission, it may be acceptable to permit the console 112 to pre-empt the radio transmission on the same channel by allowing the console transmission from the switch 108 to overpower the existing mobile radio transmission.

Figure 5:
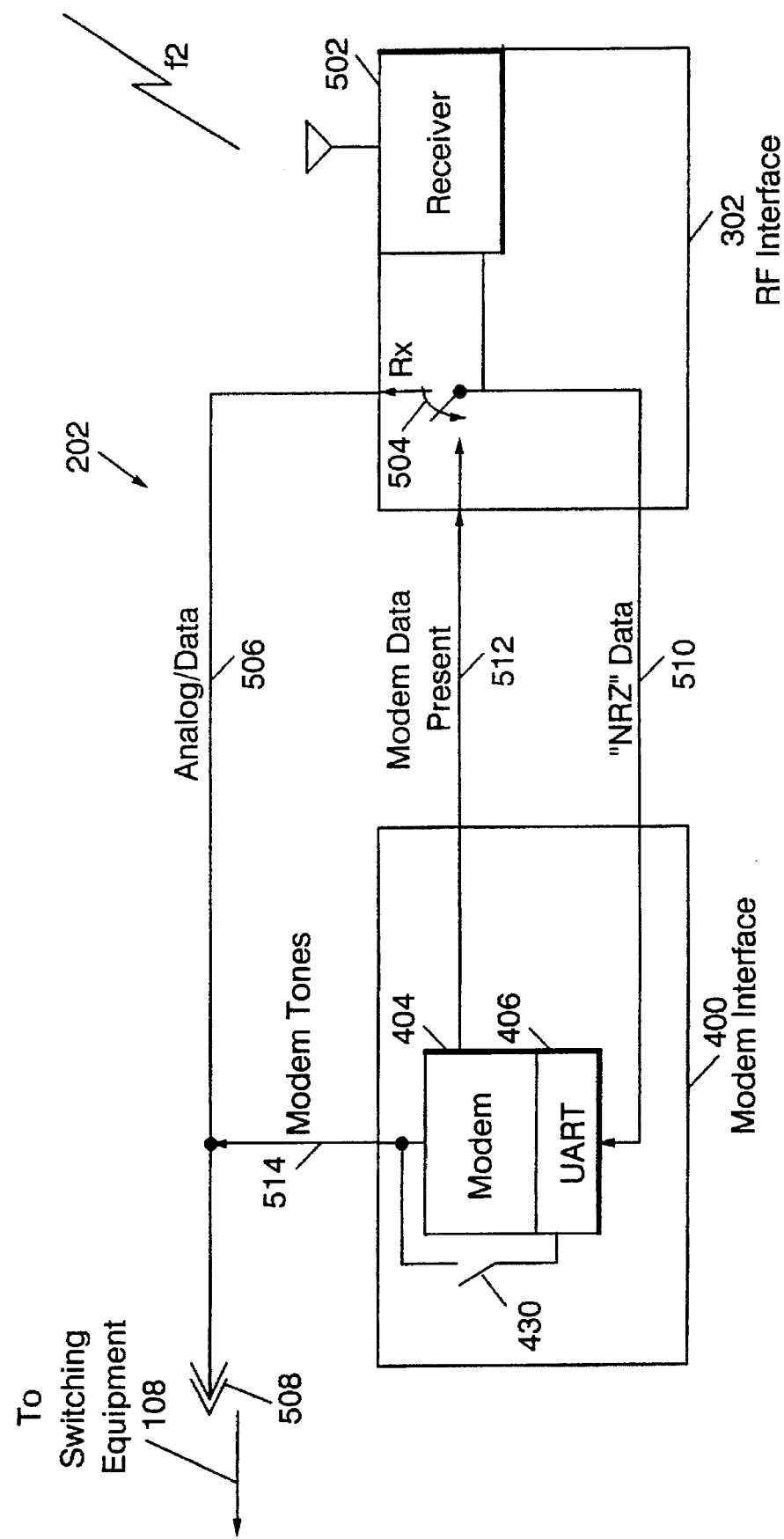
FIG. 5 is a block schematic diagram of the receive path of the RF site link for receiving audio and digital signals from the base station site in accordance with the one embodiment of the present invention.

FIG. 5 illustrates the communications path of RF link device 202 components used to receive clear voice or digital (modem data) from a base station 102 (FIG. 2) for switching by the centralized switching equipment 108 (FIG. 2). A RF link receiver 502 will receive the clear voice or digital signals on the assigned base station transmit repeater frequency f2 of the assigned working channel 210 corresponding to the RF link device 202. The received signals will be switched through the switching equipment 108 and transmitted to other base stations 102 only when a channel assignment from the originating base station 102 informs the switching equipment 108 via the RF control link 214 that audio on the working channel 210 is active.

In accordance with the present invention, the receiver 502 is connected to the UART 406 by transmission path 510 for receiving digital signals and to one terminal of a normally closed switch 504 to transmit clear voice along transmission path or link 506 to an input 508 of the centralized switching equipment 108. The RF working channel 210 and RF link receiver 502 operate as a transparent transport of digital or voice guard communications signals.

Because switch 504 is normally closed, transmission signals, both clear voice and digital, are transmitted along transmission path 506 and along transmission path 510 to the UART 406 and modem 404. If the transmission signals are clear voice, switch 504 remains closed and the signals continue to pass along transmission path 506. If the transmission signals are digital, the digital detection capabilities of modem 404 will cause the switch 504 to open as shown in FIG. 5 by sending a modem data present signal along conductor 512. The modem 404 will convert the digital transmissions to modem data before routing the converted signals to the switching equipment input 508 via transmission path 514.

During a digital or voice guard call or transmission, any errors in the data transmission from the RF site link device 202 equipment to the base station receive repeater Rx will be handled by a higher level protocol between the source of the data transmission and the radio 104 receiving the data transmission. This higher level protocol may simply involve the receiving radio transmitting back to the source an acknowledgment signal.

In accordance with a further embodiment of the present invention, in a system that uses digital switching equipment for central switch 108 and digital transmission equipment in the RF link devices 202, all calls pass through the communications system as digital data and the modems 404 and controlled switches 410 and 504 may be eliminated. Embodiments for the transmit and receive paths for the RF link device 202 for such an all digital system are illustrated in FIGS. 6 and 7, respectively.

Figure 6:
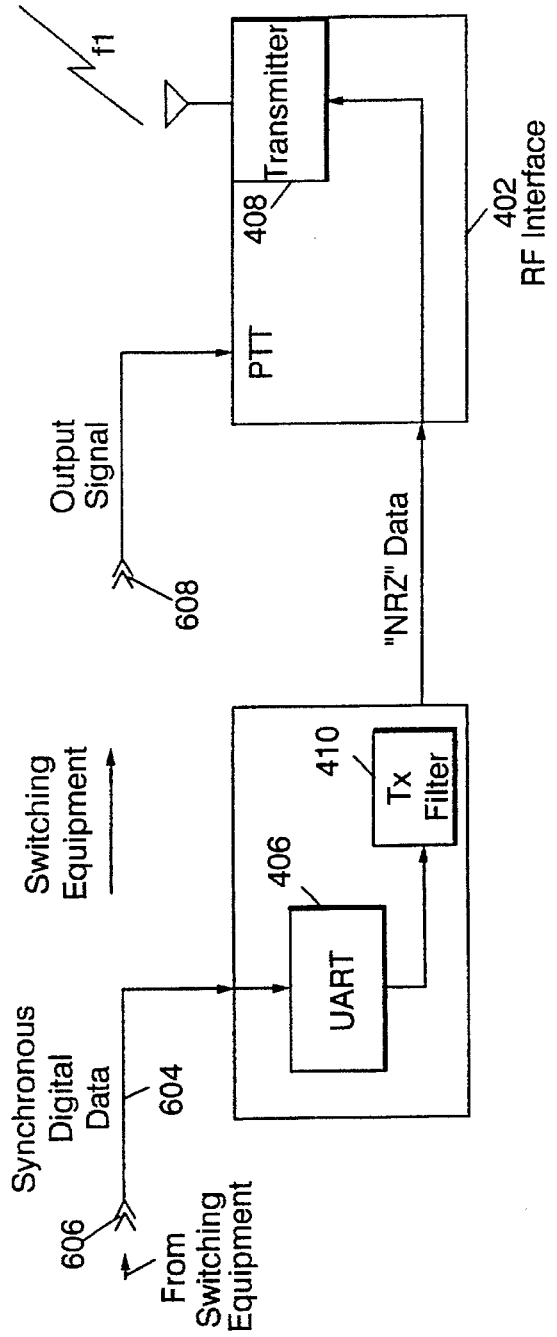
FIG. 6 is a block schematic diagram of the transmit path of a RF site link for an all digital RF communications system in accordance with another embodiment of the present invention.

For transmission from the central switch 108 to the base station 102, switched digital signals are received by a UART 406 over a transmission link 604 from an output terminal 606 of the central switch 108 (not shown in FIG. 6). The UART 406 may be connected to a Tx filter or translator 410 to convert the data to non return to zero ("NRZ") data for transmission by the transmitter 408. A working channel 210 will be assigned by the site/switch control link 214, similar to that described with respect to FIG. 2, and the transmitter will transmit the digital signals over frequency f1 of the assigned working channel for receipt by the RF receive repeater (not shown) for the assigned channel at the base station 102 (FIG. 2). Similar to that described with respect to the analog/modem data RF link system, the transmitter 408 in the all digital system is keyed when an output signal from the central switch 108 is sent to the push-to-talk (PTT) terminal of the RF interface 402.

Since the all digital system does not use a four wire telephone interface, E&M signaling is not available. An external signaling method will have to be employed to key the transmitter 408. A bit from a dedicated output port 608 from the central switch 108 may be used for this purpose.

Figure 7:
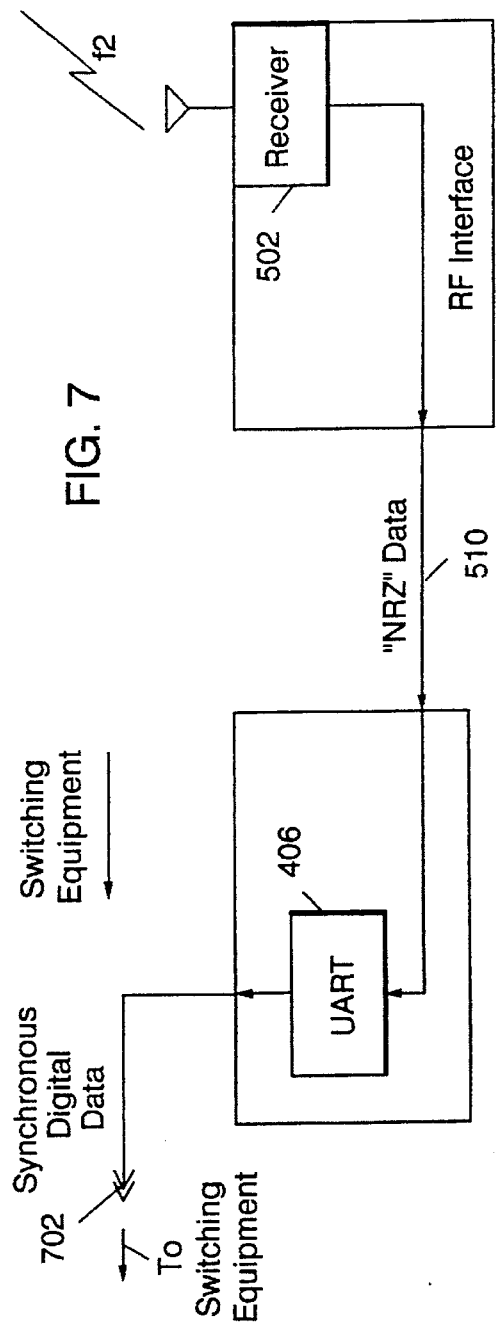
FIG. 7 is a block schematic diagram of the receive path of a RF site link for an all digital RF communications system in accordance with the other embodiment of the present invention.

Referring to FIG. 7, digital signals transmitted from the transmit repeater (not shown in FIG. 7) of a base station 102 over frequency f2 of an assigned working channel 210 will be received by the receiver 502 which is connected by transmission path 510 to the UART 406. The UART 406 then transmits the synchronous digital data to an input 702 of the switching equipment 108.

If synchronous serial data ports are a desired feature of the communications system, the digital call data may be left on separate digital data channels, as opposed to multiplexing on a T1 line, and the digital channels can be transmitted over the RF site link in a similar manner as the digital modem data described with respect to FIGS. 4 and 5. Since no modem tones are involved, modem 404 may be bypassed by a suitable switching arrangement 430 as shown in FIGS. 4 and 5, such as configuring the system with a DIP switch setting.

Figure 8:
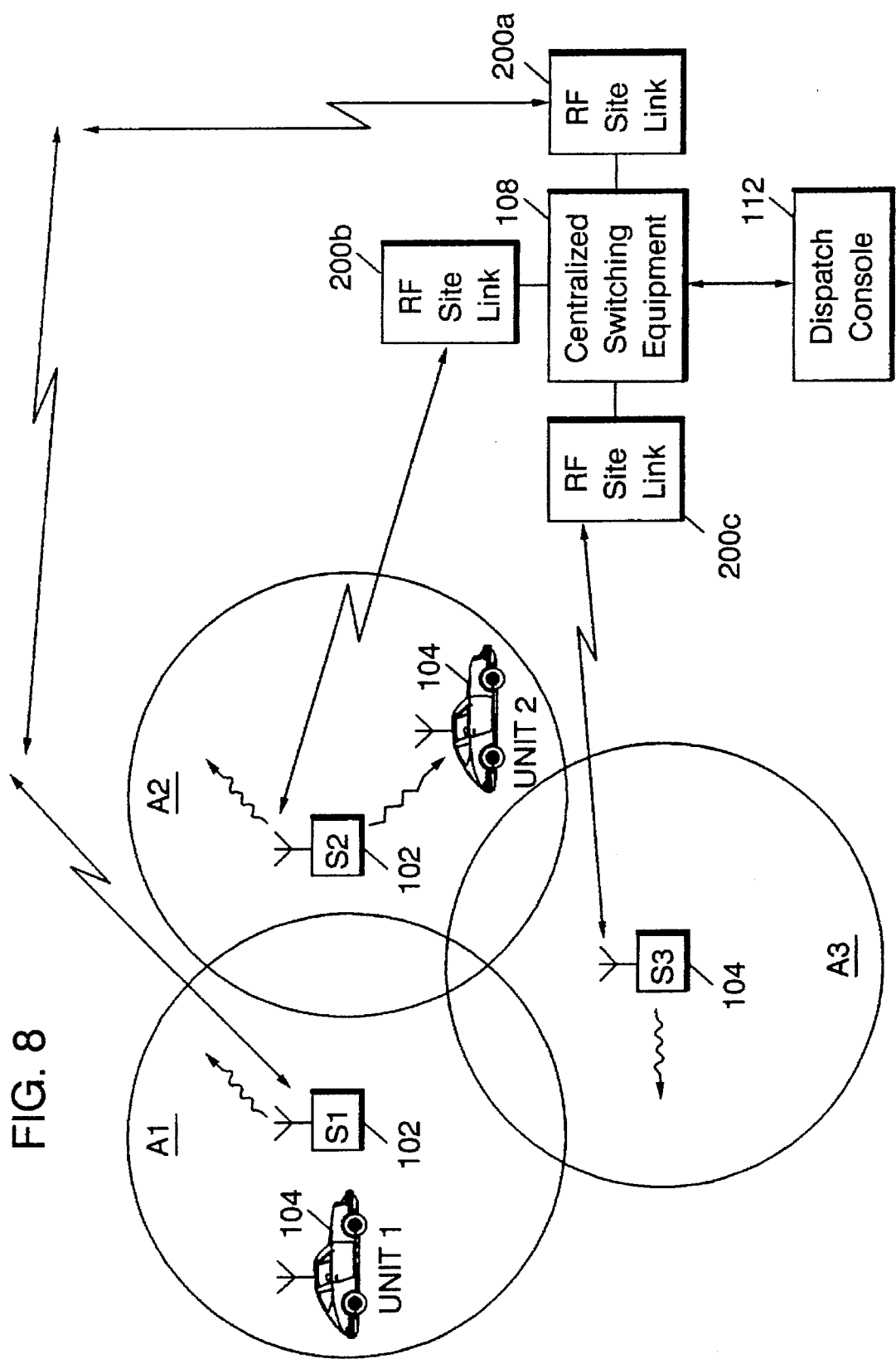
FIG. 8 is a block schematic diagram of a RF communications system with multiple site base stations interconnected to a central switch by RF site links in accordance with the present invention.

FIG. 8 illustrates a RF communications system with multiple base stations 102 at different sites S1, S2 and S3 which respectively serve different geographical areas A1, A2 and A3. As previously described, calls between units or groups of units 104 physically located in different geographical areas will be switched through the central switch 108. In accordance with the present invention, the calls will be transmitted between the different sites S1, S2 and S3 by a respective RF site link 200 as previously described with reference to FIGS. 2–7. To summarize, referring also to FIG. 2, a unit 1 in area A1 desiring to communicate with unit 2 in area A2 will initially request a working channel from site S1 over the site/radio control channel 212 (FIG. 2) and base station S1 will assign the corresponding RF link channel or device 202 of the RF site link 200a associated with the assigned working channel 210 over the site/switch control channel 216 and site/switch control link 214. Signals transmitted from the requesting unit 1 over the site/radio control channel 212 and site/switch control channel 216 to the centralized switching equipment 108 cause the central switch 108 to make the appropriate connection to RF site link 200b which in turn requests a channel assignment from site S2 which will correspond to a working channel 210 assigned by the site/radio control channel 212 for communication between the site S2 and the mobile unit 2 in area A2. After assignment of the working channels 210 and associated RF link channels or devices 202 by the control channels 212 and 216, duplex communication between unit 1 and unit 2 may occur.

The RF site links 200a–200c and the RF link devices 202 thereof are not dedicated or allocated to a particular talk group or group of units but rather the RF site link equipment is shared by all users or subscribers in a trunked manner and multiple talk groups or units can be communicating simultaneously over different RF link devices 202 of the same RF site link 200.

Figure 9:
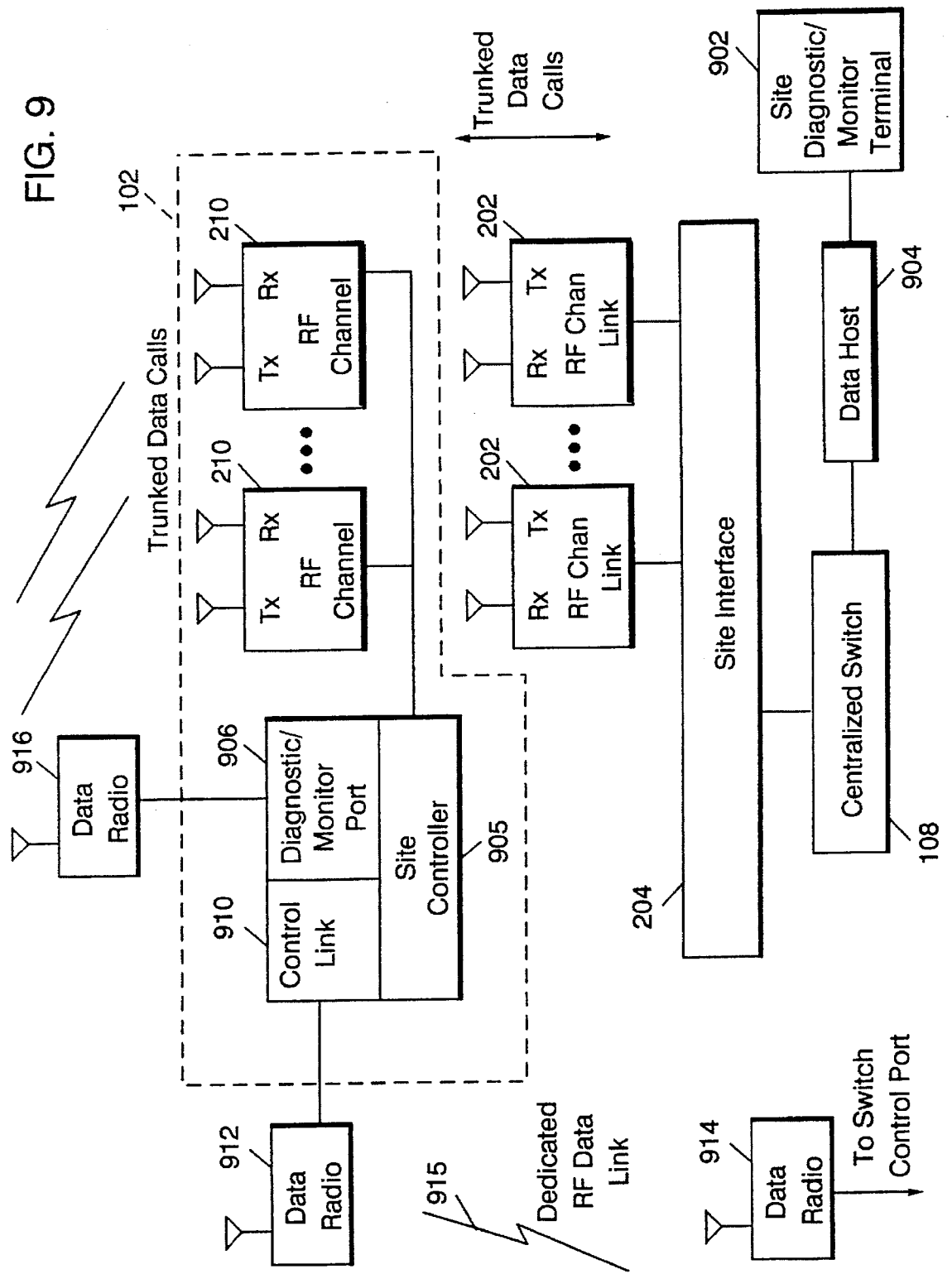
FIG. 9 is a block schematic diagram of a trunked data radio diagnostic/monitor link in accordance with an embodiment of the present invention.

A mobile communications RF base station site 102 will typically have at least one data communications link other than the main call processing control link. Data links to the site are used for site "dial up" diagnostic and reconfiguration activities, as well as to download usage and alarm data to a host processor for analysis. These data links may be a dial-up modem connection since the connection is only required during diagnostic/monitoring procedures; however, if a dial-up telephone line is not available to the RF base station 102, a trunked data radio diagnostic/monitor link such as that shown in FIG. 9 may be used or a dedicated RF link may be employed where large amounts of data are transferred or continuous monitoring requirements call for such a dedicated data link. In the case of a dedicated RF link, the same RF transmission system as previously described for call processing may be used for the dedicated diagnostic/ monitor links; however, each of these links will require a new Tx/Rx frequency pair or channel to be allocated to the base station 102.

The trunked data radio diagnostic/monitor link includes several of the same components described with respect to the RF site link arrangement previously described. The diagnostic/monitor link further includes a site diagnostic/ monitor terminal 902 which provides an operator interface for conducting the diagnostic testing and monitoring. The terminal 902 is tied to a data host 904 to which information may be uploaded or downloaded to or from the base station 102 under the control of an operator at the terminal 902. The data host 904 is connected to the central switch 108 which in turn is connected to the site interface 204. As previously described, the site interface 204 is connected to the RF link devices 202 which communicate with the base station 102 over an assigned working channel 210. The base station 102 includes a diagnostic/monitor port 906 which is part of the site controller 905. The site controller 905 includes a control link terminal 910 which is connected to a data radio 912 which communicates with data radio 914 over a dedicated RF data link 915. The data radio 914 is connected to a switch control port of the centralized switch 108. The data radios 912 and 914 are the site control link. The diagnostic and monitor port 906 is tied to another data radio 916. The RF diagnostic link is actually through trunked data "calls" on the site's working channels. Data radio 916 makes data calls through the working channels to the data host 904, just like any other data subscriber. The data host then sends the data to the diagnostic/monitor terminal 902. Likewise, the terminal 902 sends data to the data host 904 which performs data calls to data radio 916 just like data calls to any other data capable radio on the site. Data radio 916 sends its received data to the site controller diag/monitor port 906.

Those skilled in the art will recognize that the present invention permits the elimination of the leased telephone lines and/or microwave transmission equipment which is commonly used to connect a mobile communications RF site to a centralized switching device.

Additionally, it will be readily understood by those skilled in the art that the present invention is not limited to the specific embodiments described and illustrated herein. Different embodiments and illustrations besides those shown herein and described, as well as variations, modifications and equivalent arrangements will now be apparent or will be reasonably suggested by the foregoing specification and drawings without departing from the substance or scope of the invention. While the present invention has been described herein in detail in relation to its preferred embodiments, it will be understood that this disclosure is only illustrative and exemplary of the present invention and is made merely for purposes of providing a full and enabling disclosure of the invention. Accordingly, it is intended that the invention be limited only by the spirit and scope of the claims appended hereto.

What is claimed is:

1. In a radio frequency (RF) communications system, a RF site communications link for transmitting and receiving signals between centralized switching equipment and at least one of a plurality of remote mobile communications RF base stations, said RF site link comprising:

a plurality of RF link devices connected to the centralized switching equipment, each for transmitting and receiving signals on a different one of a plurality of working channels associated with each of the base stations and said plurality of working channels at each base station also transmitting signals to and receiving signals from at least one radio, said radio and one of said RF link devices transmitting on a first frequency of one of said working channels; and receiving on a second frequency of said one of said working channels and said base station receiving on said first frequency and transmitting on said second frequency during duplex communication; and a RF control link to control assignment of said RF link devices in coordination with assignment of the working channels for communications between the centralized switching equipment and each base station.

2. The RF site link of claim 1, wherein each of said RF link devices comprises:

a universal asynchronous receiver/transmitter (UART) device connected respectively to a transmit terminal and a receive terminal of the centralized switching equipment; and a transmitter connected to an output of said UART device to transmit digital signals to at least one of said base stations on said first frequency of an associated working channel when an output signal from the centralized switching equipment is present at a push-to-talk (PTT) terminal of said RF link device; and a receiver connected to an output of said UART device to receive digital signals from one of said base stations on said second frequency of an associated working channel.

3. The RF site link of claim 2, wherein each of said RF link devices further comprises one of a transmit filter or a translator connected between said UART and said transmitter to convert the digital signals to a form acceptable by said transmitter.

4. The RF site link of claim 1, wherein each of said RF link devices comprises:

a transmitter;

a modem connected respectively to a transmit terminal and a receive terminal of the centralized switching equipment;

a UART connected to said modem;

a first switch for alternatively connecting said transmitter to said transmit terminal of the centralized switching equipment and to said UART, said switch normally connecting said transmitter to said transmit terminal to transmit audio signals from the centralized switching equipment to at least one of said base stations on said first frequency of an associated working channel when an output signal from the centralized switching equipment is present at a PTT terminal of said RF link device, and said modem causing said switch to connect said transmitter alternatively to said UART, when said modem detects digital data signals being transmitted from the centralized switching equipment, to transmit the digital data signals to at least one of said base stations on said first frequency when said output signal from the centralized switching equipment is present at the PTT terminal of said RF link device;

a receiver connected to said UART; and a second switch normally connecting said receiver to a receive terminal of the centralized switching equipment to receive audio signals from one of said base stations on a second frequency of an associated working channel, and said modem causing said second switch to disconnect said receiver from the centralized switching equipment when said modem detects digital data signals being received by said receiver from one of said base stations on said second frequency of an associated working channel.

5. The RF site link of claim 4, wherein each of said RF link devices further comprises one of a transmit filter or a translator connected between said UART and said first switch to convert the digital data signals to a form acceptable by said transmitter.

6. The RF site link of claim 1, further comprising means for performing diagnostic and monitoring functions on the system.

7. A radio frequency (RF) communications network comprising:

a) a plurality of mobile stations;

b) a first base station having a first base station area and a second base station having a second base station area, each base station communicating with mobile stations located in its base station area by transmitting and receiving radio frequencies;

c) a RF mobile station link for temporarily linking each base station and the mobile stations located within the associated base station area to provide for trunked, full-duplex communications between the base station and the mobile stations in the associated base station area, each RF mobile station link including:

i) a plurality of working channels with each working channel temporarily linking the base station and at least one of the mobile stations in the associated base station area for transferring messages between the base station and the linked mobile station, wherein each working channel has a different first and second radio frequency where the first frequency is assigned as a transmitting frequency for the base station and as a receiving frequency for the linked mobile station and where the second frequency is assigned as a receiving frequency for the base station and as a transmitting frequency for the linked mobile station, ii) a channel assignment controller for assigning individual working channels to requesting mobile stations in the associated base station area, iii) a mobile/site control channel having a first and second frequency for receiving call requests from mobile stations in the associated base station area on the first frequency and for transmitting the working channel assignments assigned by the channel assignment controller to the requesting mobile stations in the associated base station area on the second frequency of the control channel; and d) an RF site link and switch device for relaying a message from a first mobile station in the first base station area to a second mobile station in the second base station area and vice versa, comprising:

i) a first RF site link having a plurality of link devices for linking the first base station and the first mobile station with the RF site link and switch device, the first RF site link comprising:

A) a plurality of RF link channels with each RF link channel having a first and second radio frequency for providing full-duplex communications between the RF site link and switch device and the first base station, B) a site/switch control channel having a first and second frequency for conveying control messages between the RF site link and switch device and the first base station, ii) a second RF site link having a plurality of link devices for linking the second base station and the second mobile station with the RF site link and switch device, the second RF site link comprising:

A) a plurality of RF link channels with each RF link channel having a first and second radio frequency for providing full-duplex communications between the RF site link and switch device and the second base station, B) a site/switch control channel having a first and second frequency for conveying control messages between the RF site link and switch device and the second base station, iii) a centralized switching equipment connected to the first and second RF site links comprising:

A) means for associating the RF link channels of the first RF site link with the working channels of the first base station and the link channels of the second RF site link with the working channel of the second base station in response to the control messages of the site/switch control channels, wherein messages are transmitted and received between the first mobile station and the centralized switching equipment on a working channel and associated RF link channel, B) means for relaying messages received at the centralized switching equipment from the first mobile station to the second base station and the second mobile station, wherein messages received at the centralized switching equipment from the first mobile station are transmitted to the second base station and from the second base station to the second mobile station on a link device of the second RF site link and an associated working channel.

8. The RF site link of claim 7, wherein each of said RF link devices comprises:

a universal asynchronous receiver/transmitter (UART) device connected respectively to a transmit terminal and a receive terminal of the centralized switching equipment; and a transmitter connected to an output of said UART device to transmit digital signals to at least one of said base stations on said first frequency of an associated working channel when an output signal from the centralized switching equipment is present at a push-to-talk (PTT) terminal of said RF link device; and a receiver connected to an output of said UART device to receive digital signals from one of said base stations on said second frequency of an associated working channel.

9. The RF site link of claim 8, wherein each of said RF link devices further comprises one of a transmit filter or a translator connected between said UART and said transmitter to convert the digital signals to a form acceptable by said transmitter.

10. The RF site link of claim 7, wherein each of said RF link devices comprises:

a transmitter;

a modem connected respectively to a transmit terminal and a receive terminal of the centralized switching equipment;

a UART connected to said modem;

a first switch for alternatively connecting said transmitter to said transmit terminal of the centralized switching equipment and to said UART, said switch normally connecting said transmitter to said transmit terminal to transmit audio signals from the centralized switching equipment to at least one of said base stations on said first frequency of an associated working channel when an output signal from the centralized switching equipment is present at a PTT terminal of said RF link device, and said modem causing said switch to connect said transmitter alternatively to said UART, when said modem detects digital data signals being transmitted from the centralized switching equipment, to transmit the digital data signals to at least one of said base stations on said first frequency when said output signal from the centralized switching equipment is present at the PTT terminal of said RF link device;

a receiver connected to said UART; and a second switch normally connecting said receiver to a receive terminal of the centralized switching equipment to receive audio signals from one of said base stations on a second frequency of an associated working channel, and said modem causing said second switch to disconnect said receiver from the centralized switching equipment when said modem detects digital data signals being received by said receiver from one of said base stations on said second frequency of an associated working channel.

11. The RF site link of claim 10, wherein each of said RF link devices further comprises one of a transmit filter or a translator connected between said UART and said first switch to convert the digital data signals to a form acceptable by said transmitter.

12. The RF communications network of claim 7 further including a dispatch console connected to the switch and wherein the dispatch console includes means for preempting a transmitting mobile station.

13. The RF communications network of claim 7 wherein the site/switch control channel and the site/radio control channel operate on different frequencies and each RF link channel is associated with a different working channel.

14. The RF communications network of claim 12 wherein the means for preempting a transmitting mobile station includes means for assigning the transmitting mobile station being preempted to a new idle working channel so as to avoid interference from the transmitting station.

15. In a radio frequency (RF) communications network having a remote base station for transmitting and receiving signals with mobile stations on radio frequencies and having a multi-site switch communicatively linked to the base station, a method for communicatively linking the base station with the multi-site switch, comprising:

a) linking the base station to mobile stations by temporarily assigning working channels to mobile stations where each working channel has a first frequency and a second frequency to provide for full duplex communications between the base station and the linked mobile station, the step of linking the base station to the mobile stations including for each linked mobile station:

i) transmitting signals from the base station to a linked mobile station on the first frequency of an assigned working channel and receiving signals at the linked mobile station on the first frequency of the assigned working channel, ii) transmitting signals from a linked mobile station on the first frequency of an assigned working channel and receiving signals at the base station on the second frequency of the assigned channel;

b) linking the base station to the multi-site switch so as to transmit and receive signals on radio frequencies by assigning RF link channels providing for full-duplex communications between the multi-site switch and the base station, the step of linking the base station to the multi-site switch further including for each RF link channel:

i) transmitting and receiving control messages over a dedicated site/switch control channel between the base station and the multi-site switch, ii) associating each RF linked channel with an assigned working channel in response to control messages conveyed on the site switch control channel where the RF link channel has a first frequency and a second frequency corresponding to the associated work channel, iii) transmitting signals from the multi-site switch to the base station on the second frequency and receiving signals at the base station on the first frequency of the RF link channel and corresponding working channel, and iv) transmitting signals from the base station to the multi-site switch on the first frequency and receiving signals at the multi-site switch on the first frequency of the RF link and corresponding working channel.

* * * * *